United States Patent
Iglesias

(10) Patent No.: US 7,662,196 B2
(45) Date of Patent: Feb. 16, 2010

(54) PROCEDURE FOR GASIFICATION OF GLYCERINE

(75) Inventor: Manuel Bao Iglesias, Madrid (ES)

(73) Assignee: Uee-Enviroconsult, S.L., Campo de las Naciones, Madrid ( * ) Notice: Subject to any disclaimer, the term of this patent is extended or adjusted under 35 U.S.C. 154(b) by 4 days.

(21) Appl. No.: 12/070,529

(22) Filed: Feb. 19, 2008

(65) Prior Publication Data

US 2008/0196307 A1    Aug. 21, 2008

(30) Foreign Application Priority Data

Feb. 20, 2007  (ES)  ................... 200700442

(51) Int. Cl.
*C10L 3/00* (2006.01)
(52) U.S. Cl. ................................. 48/197 FM
(58) Field of Classification Search ............ 48/197 FM
See application file for complete search history.

(56) References Cited

U.S. PATENT DOCUMENTS 4,377,066 A * 3/1983 Dickinson .................... 60/775

2007/0101640 A1 * 5/2007 Tsuto et al. ................... 44/389

FOREIGN PATENT DOCUMENTS

| EP | 1724326 | 11/2006 |
| WO | WO2005052097 | * 9/2005 |

OTHER PUBLICATIONS

"*Baskets and Heaters.*" R.D. Mathis: Product Catalog, The R.D. Mathis Company. n.d., Web. May 7, 2009, http://www.rdmathis.com/storev2/category.asp?cat=Baskets%20and%20Heaters.
"*Vacuum Evaporation Sources.*" Coils & Filaments, CM Furnaces Inc. n.d., Web. Jun. 10, 2009, www.cmfurnaces.com.

* cited by examiner

*Primary Examiner*—Jennifer K Michener
*Assistant Examiner*—Imran Akram
(74) *Attorney, Agent, or Firm*—John C. McMahon

(57) ABSTRACT

Procedure for the use of glycerine as biomass, for the production of energy by means of a spray gasification process, based on the use of a mixture of oxygen, vapour and atmospheric air as gasifying agents, which are introduced into a Gasification Chamber at temperatures above 900° C., so that the gas produced is transferred to a Reformer wherein, also at temperatures above 900° C., the different partial oxidation/thermal cracking reactions in the presence of metal oxides are completed and, subsequently, hot cycloned to retain ashes greater than 5 microns in size, whereupon the gas is sharply cooled using a basket-type Evaporator.

5 Claims, 1 Drawing Sheet

PROCEDURE FOR GASIFICATION OF GLYCERINE

FIELD OF THE INVENTION

The present invention is encompassed in the renewable energy technology sector and, more specifically, the industrial sector relative to gasification technology, and relates to a new gasification system that uses glycerine as biomass.

STATE OF THE ART

The use of glycerine as a combustible raw material is interesting in that a surplus of said compound is expected in the production of biodiesels, as its use as a product poses a serious problem, acquiring the category of waste due to the need to eliminate it. Applications in chemical-type transformations can be found in the long term, but the development of conventional combustion processes is not expected in the short and medium term, due to the very low volatility of glycerine, which impedes its ignition.

The present invention aims to offer a novel alternative to energy production from glycerine using gasification processes.

Gasification is a well-known thermochemical process, widely used during World War II, whereby organic matter is transformed into a combustible gas with low calorific power, by means of a series of reactions that take place at a certain temperature and in the presence of a gasifying agent. The main objective of gasification is to transfer the maximum amount of chemical energy from gas feed to fractioning and receive a high-performance combustible gas comprised mainly of gaseous products with a low molecular weight. This technology enables the production of renewable and less contaminating energy. In conventional gasification systems, treatment of solids is carried out on a large scale using fluidized bed gasifiers, but treatment of liquids, such as glycerine, requires spray gasification in high-temperature gas currents, an unknown technique that has been specifically designed for application to glycerine.

Decomposition of the molecular structure of glycerine requires prior thermal increase, above 900° C., and maintenance thereof in the reaction system until its full conversion, as the presence of particulate matter in the gas flow compromises the feasibility of the expected applications. Additionally, the temperature must be maintained between 900° C. and 1,000° C. to prevent the formation of NOx and, at the same time, reach sufficient reaction speed for high glycerine conversions. Patent EP1724326 relates to a solid biomass gasification system that uses oxygen to remove the soot produced by the pyrolysis of lignocellulose, wherein temperatures of between 600° C. and 900° C. are applied in the gasification chamber, said temperatures not being high enough for application to glycerine.

Plasma gasification requires very high temperatures in almost total absence of oxygen to decompose waste materials to a basic molecular structure. Plasma gasification does not burn in the manner of boilers. It converts organic waste into a gas comprised of carbon monoxide (CO) and hydrogen (H) that still contains all of the waste's energy. It converts inorganic waste into an inert glass. Plasma is considered a differentiated state of matter. Electricity is supplied to a torch with two electrodes, which ionizes a gas (normally air or water vapour). The gas generated during the gasification process passes through the torch generated in the recombination of the ionized gas and heats said gas at internal temperatures as high as 25,000° F. This gasification system ensures high temperatures but does not simultaneously ensure adequate residence times, i.e. the permanence of the substance until its total disappearance by means of reaction or consumption, which makes its application to glycerine inadequate.

In order to solve the aforementioned problems, the present invention relates to a novel method of using glycerine as biomass in gasification processes.

DESCRIPTION OF THE INVENTION

Figure 1:
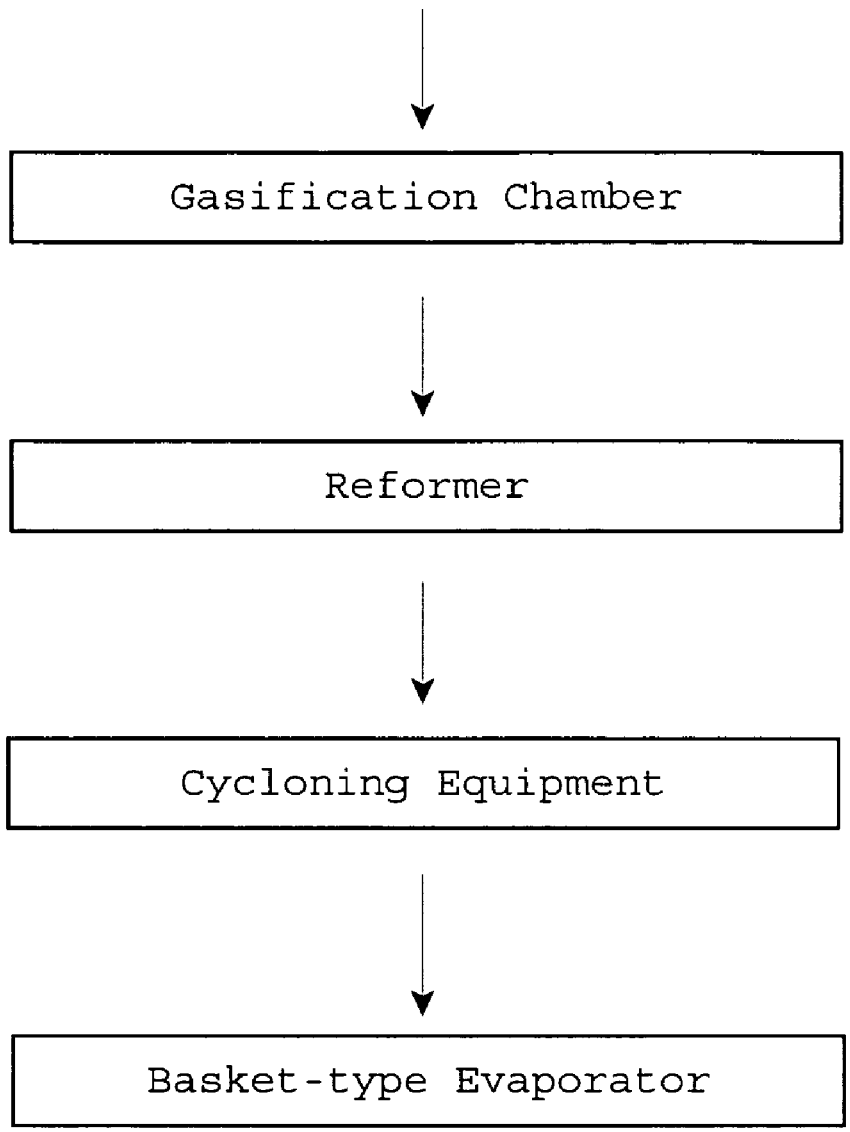
FIG. 1 is a generally schematic flow chart illustrating the steps of processing glycerine to energy in accordance with a described embodiment of the invention.

The invention is fundamentally based on the use of glycerine as biomass in a spray gasification process, for the production of energy, based on the use of a mixture of oxygen, vapour and atmospheric air as gasifying agents and maintaining the whole cyclone gasifying system at a temperature of between 900° C. and 1,000° C. The mixture of oxygen, air and water vapour may vary according to the characteristics required for the gas product. A greater proportion of air-vapour reduces production costs but causes more nitrogen to be incorporated to the output gas, while a greater proportion of oxygen-vapour reduces the presence of nitrogen, but at a higher cost.

As shown in FIG. 1, the procedure consists of several phases:

1. High-temperature gasification chamber (>900° C.) into which the gasifying agents and glycerine are introduced, the latter by means of spraying.

2. Reformer wherein, also at temperatures above 900° C., the different partial oxidation/thermal cracking reactions in the presence of metal oxides are completed.

3. Hot cycloning that retains ashes greater than 5 microns in size.

4. Basket-type evaporator wherein the gas is sharply cooled. This evaporator imposes conditions on the enclosure, by means of turbulent mixture (T=450° C.) and generates vapour within the pipes at 275° C. (60 bar) which can be added to the expansion cycle of a single-cycle vapour turbine combined or used in the process. The gas at 450° C. is cooled, counter-current, using compressed air at 20 bar or by means of exchange with process currents (if energetic integration is applicable), to below 100° C. for compression thereof at 20 bar in isothermal operation, approximately, for subsequent humidity treatment with acid for retention of ammonia and, afterwards, with a reactive limestone suspension for retention of acidic components, thereby producing a "clean" gas, compressed at 20 bar, that can be used in energy production, modified in a new reformer to produce synthesis gas or, by means of $CO_2$ absorption, to produce quality hydrogen.

In order to complement the preceding description and with the aim of aiding towards a better understanding the characteristics of the invention, a detailed description of a preferred embodiment is provided below.

The glycerine produced as a waste in biodiesel production processes is introduced into a gasification chamber by means of spraying at temperatures above 900° C., together with a mixture of a oxygen, vapour and atmospheric air as gasifying agents. In the case of gasification with pure oxygen, the amount of oxygen required is between 0.05 and 0.1 Kg O2/Kg of glycerine and, in case of using oxygen-enriched air or atmospheric air, higher loss due to dilution and cooling of a greater flow and higher compression and manipulation costs would have to be considered. Consideration must be given to the fact that the glycerine used is not a pure chemical product, but rather the waste of biodiesel production which, accompanied by different impurities, requires adjustment of the composition of the combustive or gasifying mixture to ensure composition and thermal conditions within the gasifier.

Subsequently, the product produced is transferred to a reformer wherein the different partial oxidation/thermal cracking reactions in the presence of metal oxides are completed, maintaining the temperature above 900° C., and is subsequently cycloned to retain the ashes produced, whereupon the gas is finally cooled. As glycerine has a standard combustion heat of 3,855 Kcal/Kg but the accompanying organic impurities have a higher calorific power, 2,335 moles of gas per glycerine formula weight (elemental formula CH2-670) is produced, the approximate composition of which ranges from 0.1 to 0.4 moles of $CO_2$, 0.3 to 0.36 moles of CO and 0.52 to 0.56 moles of $H_2$, with a calorific power that may vary from 10 MJ/Nm$^3$ to 14 MJ/Nm$^3$.

In any case, the procedure shall be optimized in accordance with oxygen availability and price, the comparison with enriched or atmospheric air and the possible energetic integration of clean gas application upon production of vapour at ambient temperature, due to which its combustion requires high temperatures for the vapour phase to exist.

The invention claimed is:

1. A procedure for gasification of glycerine comprising:
   (i) spraying waste glycerine into a gasification chamber containing a gasifying agent, wherein the gasifying agent is selected from oxygen, vapor, atmospheric air and mixtures thereof;
   (ii) gasifying the glycerine in the gasification chamber to produce a gasification product;
   (iii) reforming the gasification product in a reformer to produce a reformer product;
   (iv) cycloning the reformer product in cycloning equipment to produce a cycloning product; and
   (v) cooling the cycloning product in a basket-type evaporator to produce a cooled gas;
   wherein steps i, ii, iii and iv are performed at a temperature between 900° C. and 1000° C. and;
   wherein the cooled gas is subjected to a humidity treatment with acid and afterwards with a reactive limestone suspension.

2. The procedure according to claim 1, wherein pure oxygen is used as a gasifying agent and wherein oxygen is used in a proportion to glycerin with a range between 0.05 and 0.1 Kg $O_2$/Kg of glycerine.

3. The procedure according to claim 2, wherein at least 2.2 moles of gas are produced and wherein the gas produced comprises $CO_2$, CO and $H_2$, per mole of glycerine.

4. The procedure according to claim 3, wherein a calorific power from 10 MJ/Nm$^3$ to 14 MJ/Nm$^3$ is produced.

5. The procedure according to claim 1, wherein the gasifying agent is a mixture of oxygen, vapour and atmospheric air.

* * * * *